United States Patent Office 3,146,143
Patented Aug. 25, 1964

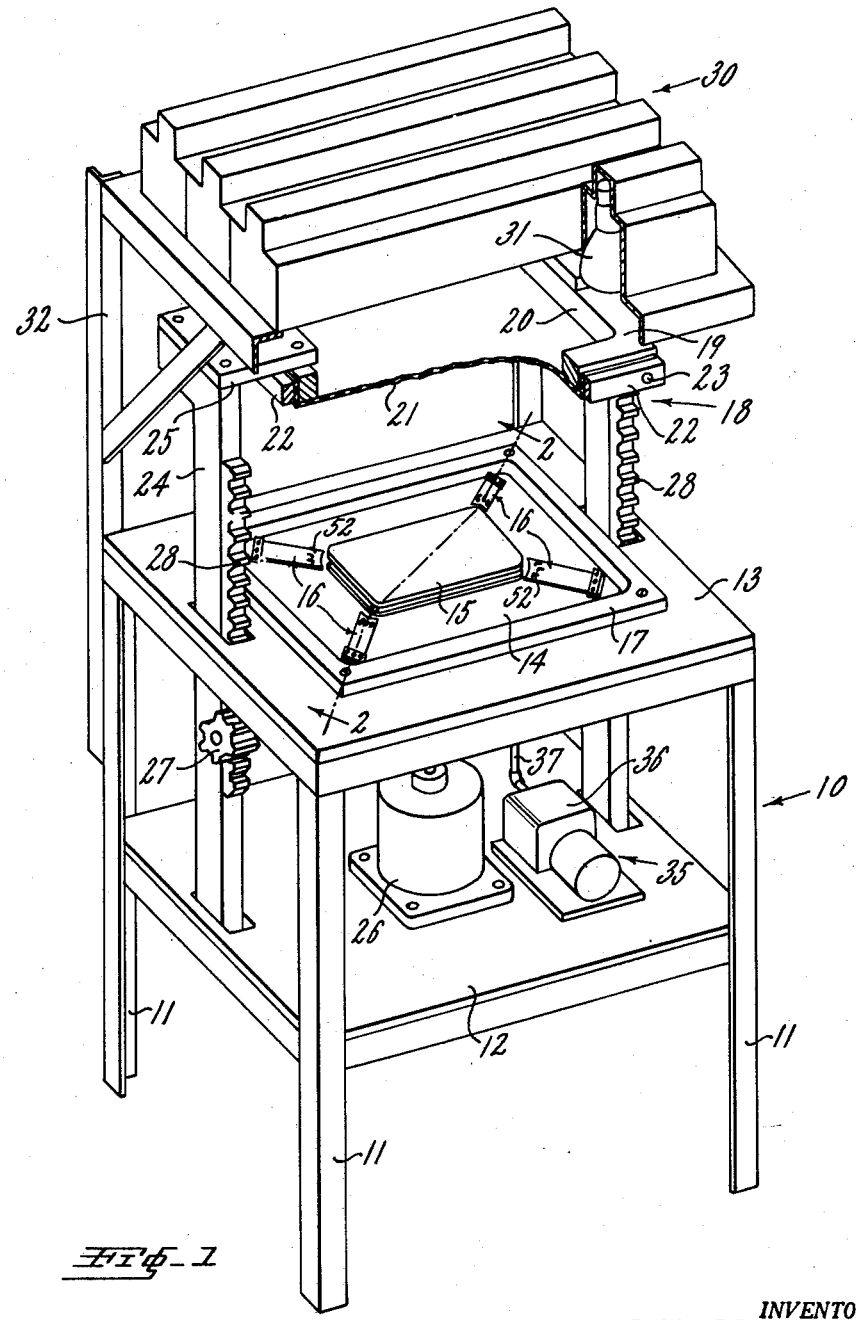

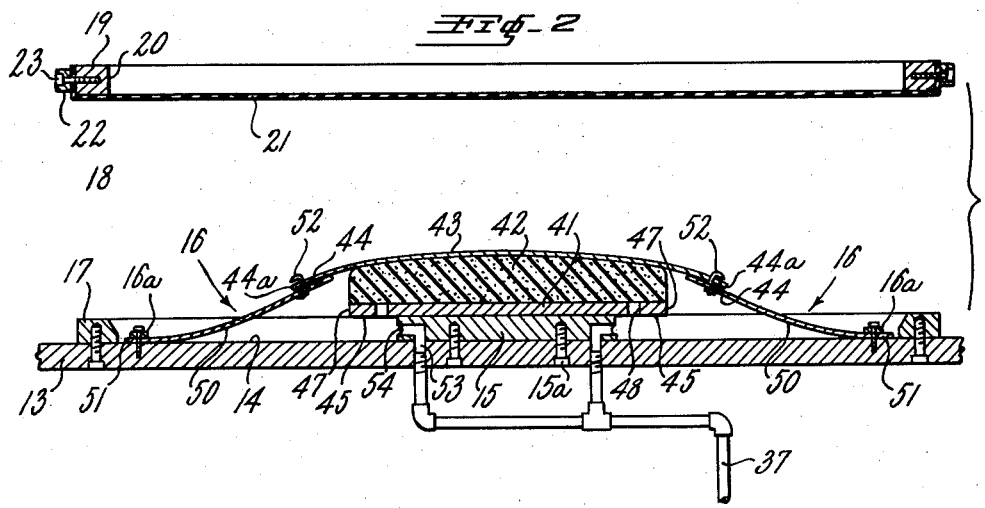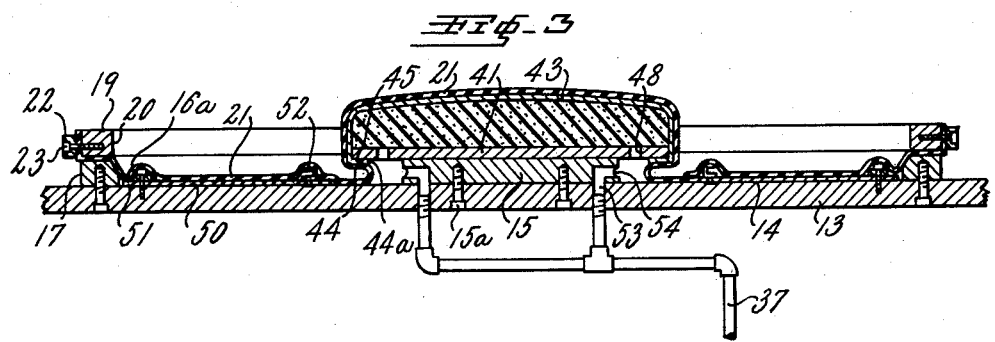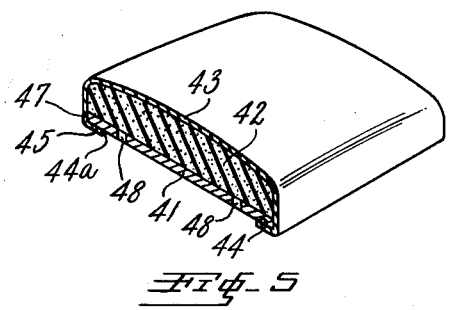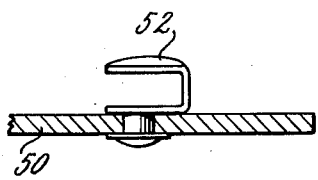

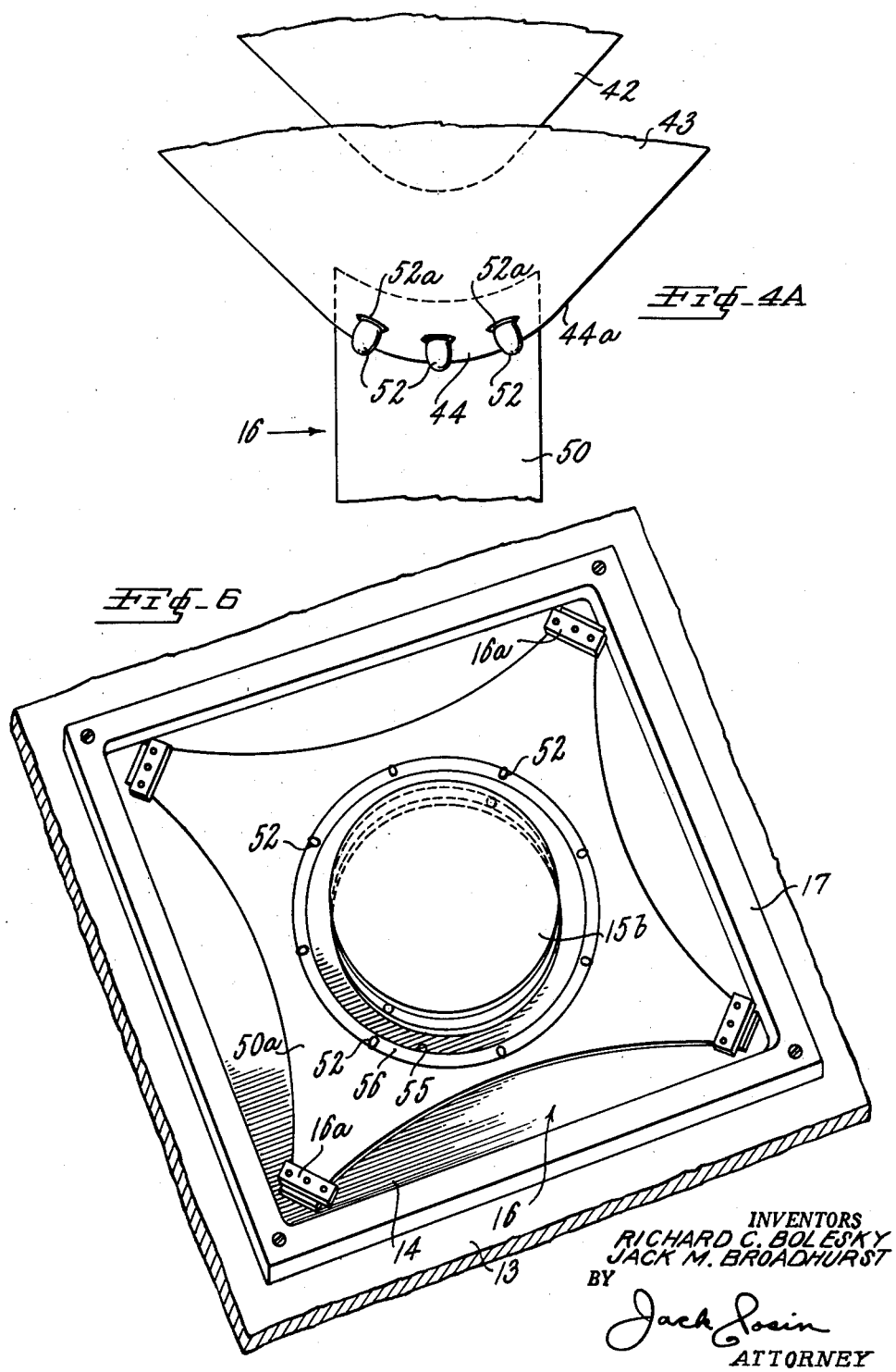

3,146,143
METHOD AND APPARATUS FOR MAKING CUSHIONED ARTICLES
Richard C. Bolesky, South Bend, and Jack M. Broadhurst, Mishawaka, Ind., assignors to United States Rubber Company, New York, N.Y., a corporation of New Jersey
Filed Apr. 7, 1961, Ser. No. 101,532
21 Claims. (Cl. 156—212)

This invention relates to a method and apparatus for making cushioned articles by vacuum-forming techniques, and to the cushioned articles made thereby. The invention may be used to make cushioned articles such as seats, seat backs, safety and decorative paddings, and the like.

The present invention is an improvement over the invention of the application of Richard C. Bolesky, Serial No. 87,973, filed February 8, 1961, and assigned to the assignee of the present application, which invention was made by said Richard C. Bolesky, prior to this invention. The subject matter shown or described in said Bolesky application is not herein claimed and said application is to be regarded as prior art with respect to this present application.

In said Bolesky application, a method and apparatus of manufacturing upholstered cushioned items by a vacuum-forming technique is described. Although the vacuum-forming techniques described are satisfactory, they give rise to a disadvantage which the invention of the present application seeks to eliminate, namely, the wrinkling of the cover fabric of the cushioned article at the sharply curved corners and/or various other curved portions about the periphery of the article during manufacture.

The present invention overcomes this disadvantage as well as the disadvantages inherently present in other prior art methods and apparatus for making cushioned articles by guiding the cover fabric material about the corners and other curved peripheral portions of the cushioned article during the manufacturing operation to thereby alleviate the wrinkling problem.

Accordingly, it is one object of my invention to provide an improved method of forming upholstered cushions.

Another object of this invention is to provide improved apparatus for forming upholstered cushions.

A further object of this invention is to provide an improved method and apparatus employing vacuum forming techniques which inhibit the formation of wrinkles at the corners and other curved peripheral portions of cushioned articles during the fabrication of the articles.

An additional object of this invention is to provide improved cushioned articles made by the method of this invention.

Further objects and advantages of this invention will become apparent as the following description proceeds.

Briefly stated, in accordance with one embodiment of this invention, the component parts of a cushioned article, including a cover fabric having an adhesive coated projecting peripheral surface, are supported on a vacuum table having fabric grippers positioned thereon; the grippers are releasably attached to the projecting peripheral portion of the cover fabric, and an elastomeric diaphragm is brought down against the vacuum table to form a sealed chamber surrounding the component parts of the cushioned article; the chamber is then evacuated to pull the diaphragm taut, causing the peripheral portion of the cover fabric to be accurately guided by the grippers about the resilient core and the base of the cushioned article, released from the grippers, brought into contact with the undersurface of the base and compressed thereagainst, thereby evenly bonding the cover fabric to the base.

While the specification concludes with claims particularly pointing out and distinctly claiming the subject matter regarded as this invention, it is believed that the invention will be better understood from the following description taken in connection with the accompanying drawings in which:

FIG. 1 is a perspective view, partly in section, of the vacuum-forming apparatus;

FIG. 2 is a partial cross-sectional view and side elevation, taken on the line 2—2 of FIG. 1, showing the cushion assembly in place on the vacuum table prior to drawing the flexible diaphragm around the assembly by a vacuum means;

FIG. 3 is a partial cross-sectional view and side elevation similar to FIG. 2 showing the diaphragm drawn firmly around the upholstered cushion assembly;

FIG. 4 is a partial cross-sectional view and side elevation showing one form of fabric gripping means employed to guide the peripheral portion of the cover fabric about the corners and curved peripheral portions of the cushioned article;

FIG. 4A is a partial plan view of a fabric gripping means similar to that of FIG. 4 and showing the manner in which the fabric gripping means engages the fabric of an upholstered cushion assembly;

FIG. 5 is a fragmentary perspective view, partly in section, of a generally rectangular cushioned article made in accordance with this invention; and FIG. 6 is a fragmentary perspective view showing an alternative arrangement for the apparatus by which it may be employed in the manufacture of a circular cushioned article.

Referring to FIG. 1, there has been illustrated a preferred form of apparatus that may be used to achieve the benefits of this invention. The apparatus includes a frame, shown generally at 10, which includes a plurality of legs 11 and a platform 12 that serves to rigidly connect the legs 11 together and as a support for various of the components associated with the apparatus.

The apparatus is provided with a vacuum table member 13 having a working surface 14 and a raised member or platform 15 positioned centrally thereon. Similarly, the table member 13 is provided with a plurality of fabric gripping means, shown generally at 16, and a raised flange 17 which defines the outer periphery of the working surface 14.

The apparatus also includes a moveable frame or platen, shown generally at 18, which comprises a perimetrical flange or frame member 19 having a large central opening 20, across which extends an elastomeric diaphragm 21. The diaphragm 21 extends beneath the perimetrical flange 19 and is clamped thereto by means of straps 22 held in place by a plurality of screws, one of which is shown at 23.

The movable frame or platen 18 is supported upon reciprocating legs 24 by means of brackets 25 which are rigidly bolted or otherwise secured to both the perimetrical flange 19 and the reciprocating legs 24. Reciprocating motion is imparted to the legs 24 by means of a reversible electric drive motor 26. The motor 26 drives a pair of pinion gears, one of which is shown at 27, by means of a pair of suitably positioned bevel gears (not shown). Pinion gears 27, in turn, cooperate with rack gears 28 carried by the legs 24. Thus, upon rotation of motor 26 in one direction, the platen 18 will move down into abutment with the table member 13, and, upon rotation in the other direction, the platen 18 will move up to the position shown in FIG. 1. Suitable limit switches (not shown) are employed to stop the drive motor 26 in its proper position after it has been energized.

Heating means, shown generally at 30, may be employed to heat the elastomeric diaphragm 21 of the movble platen 18 when it is in the upper position illustrated in FIG. 1. Heating means 30 comprises a plurality of banks of infra red lamps 31 which radiantly heat the diaphragm 21 through the opening 20 in the movable platen 18. Heating means 30 is rigidly supported upon the frame 10 by means of brackets 32 fastened to the rear legs 11 of the apparatus.

A vacuum means, shown generally at 35, and including a vacuum pump 36 and a conduit 37, is carried by the platform 12 of the apparatus. Conduit 37 communicates with the space or chamber formed between movable platen 18 and the table member 13 when the platen 18 is in its lower position abutting the table member 13. This enables vacuum forming techniques to be employed in the fabrication of cushioned articles in a manner which will become more apparent hereinafter.

The vacuum-forming techniques employed in this invention may be used in conjunction with the fabricating of rectangular cushioned articles, circular cushioned articles, and cushioned articles having various and sundry other configurations dictated by the use to which they are to be put (e.g., oval, non-symmetrical, etc.). By replacing raised member or platform 15 with a new platform having a shape corresponding to that of the new cushioned article to be fabricated, the apparatus may be easily adapted to vacuum form cushions of alternative design. In this connection it will also be necessary to re-arrange the positioning of the fabric gripping means 16 on the table member 13. To facilitate the change from a platform 15 of one configuration to a new platform of a different configuration, the platform is releasably mounted on the table member 13 by means of bolts 15a (FIG. 2). Similarly, the fabric gripping means 16 is adjustably and releasably clamped to the working surface 14 of the table 13 by means of clamps 16a (FIG. 2).

Referring now to FIG. 5, there has been illustrated one form of cushioned article that may be made in accordance with this invention. The cushioned article may comprise a relatively stiff support or base element 41, a core of resilient padding material 42, and a cover fabric element 43. The cover fabric 43 includes a peripheral portion 44 and an edge 44a which overlap and are secured by an adhesive to the peripheral portion 45 on the undersurface of the support 41, after first passing over the vertical edge 47 of the support. A plurality of apertures 48 are formed in the support 41 in order to allow air to flow out of and into the cushioned article when it is being fabricated and when it is being used in normal service.

Referring now to FIGS. 2, 3, 4 and 4A, there has been illustrated the details of the apparatus and method employed in the present invention. Initially, the support or base member 41 is centered on the platform 15 of the vacuum table 13. The relationship between the sizes of support 41 and platform 15 is such that the peripheral portion 45 of the support 41 projects outwardly from the vertical edges of the platform 15. This projecting portion 45 may be previously coated with a pressure sensitive adhesive to facilitate subsequent bonding of the cover fabric 43 to the support 41, the adhesive coating extending inwardly from the vertical edge 47 for a distance of about one inch.

The core of resilient padding material 42 is then positioned atop the support 41 and centered with respect thereto. The core 42, which may comprise a material such as latex foam rubber and which may consist of multiple layers of such resilient material or include springs or the like, may be contoured in any one of a large number of desired shapes, also depending upon the ultimate use to which the cushioned article is to be put.

At this time the sheet of cover fabric 43 is applied over the core of resilient padding material 42. The cover fabric 43 is precut in a shape similar to but larger than the surface of the support 41 so that the edge 44a of the cover fabric extends beyond the vertical edge 47 of the support when placed centrally over the core of padding material 42. The undersurface of the cover fabric 43 may also be previously coated with a pressure sensitive adhesive in the peripheral portion 44 thereof which extends beyond the vertical edge 47 of the support 41.

After positioning the cover fabric 43 in place, the fabric gripping means 16 are attached to selected points on the peripheral portion 44 of the cover fabric. In this case, since the cushioned article being fabricated is generally rectangular in form, the fabric gripping means 16 are positioned adjacent each of the corners of the cushioned article (see FIG. 1) in order that the cover fabric 43 may be drawn evenly about the corners of the cushioned article to prevent wrinkling at these points.

Referring more particularly to FIGS. 2, 4 and 4A, it may be seen that each of the fabric gripping means 16 includes a strip of inextensible material 50 having one end 51 thereof clamped to the working surface 14 of the table member 13 by means of the clamps 16a. The other end of each of the inextensible strips of material 50 support a plurality of hooks 52 adjacent the edge 44a of cover fabric 43. The cover fabric 43 may be provided with a plurality of apertures or slits 52a (FIG. 4A) closely adjacent the peripheral edge 44a thereof at points that are in alignment with the positions of the hooks 52 on the fabric gripping means 16. This allows the hooks 52 to be inserted through the slits 52a to connect the corners of the cover fabric 43 to the fabric gripping means 16 in the manner shown in FIGS. 2 and 4A for the purpose of guiding the cover fabric evenly around the corners of the core 42 and base 41 during the subsequent vacuum forming operation.

The inextensible strips of material 50 referred to above may be any conventional material or fabric having relatively little elongation when put in tension as compared to the elongation of the diaphragm 21 when similarly stressed. Thus, it is intended that the term "inextensible material" will include metals, cloths, leathers, plastics, and even rubber and rubber-like materials having large thicknesses or particular compositions giving a stress elongation appreciably lower than that of the diaphragm 21.

When the component parts (the cover fabric 43, the core 42, and the support 41) of the cushioned article have been assembled on the raised member of platform 15, and the fabric gripping means 16 have been secured to the corners of the cover fabric 43, the upper platen 18 is lowered into abutment with the vacuum table 13 so that the peripheral portion of the diaphragm 21 sealingly engages the upper surface of the raised flange 17. This forms a sealed chamber or space between the vacuum table working surface 14 and the diaphragm 21.

It will be apparent that the peripheral portion of the diaphragm 21 could be brought directly into contact with the upper surface of the vacuum table 13 without using the intermediary of the flange 17. However, in the preferred embodiment the flange 17 is desirable, since there is less initial prestressing of the diaphragm 21 as it is brought into contact with the component parts of the cushioned article.

With the diaphragm 21 sealingly engaging the vacuum table 13, the vacuum means 35 (FIG. 1) may be started in order to exhaust the air in the chamber between the diaphragm 21 and the surface of the vacuum table 13. Conduit 37 of the vacuum means 35 connects with each one of a pair of ducts 53 which, in turn, communicate with the chamber between the diaphragm 21 and the working surface 14. An annular groove 54 is provided about the periphery of the raised member or platform 15 in order to facilitate the evacuation of air by the vacuum means 35.

As the air in the chamber between the diaphragm 21 and the working surface 14 begins to evacuate, thereby lowering the pressure in the chamber, atmospheric air pressure acting on top of the diaphragm 21 begins to force the diaphragm down against the cover fabric 43 and the working surface 14 of the vacuum table member 13. The peripheral portion 44 of the cover fabric 43, being constrained in its movement by the fabric gripping means 16, is guided evenly about the corners of the core 42 and support 41, thereby minimizing and/or avoiding wrinkling of the cover fabric at these curved points. As the vacuum in the chamber increases still further, the diaphragm 21 tends to force the peripheral portion 44 underneath the support 41. This causes high tensile forces to be exerted at the connections between the hooks 52 and the peripheral portions 44 of the cover fabric 43. Since these connections have been made close to the edge 44a, the hooks 52 will tear through the cover fabric at the connecting points, thereby releasing the cover fabric 43 from the gripping means 16. By properly correlating the points of connection with the amount of vacuum employed, positive release of the cover fabric 43 from the gripping means 16 can be assured.

In the event that the undersurface of the support 41 would be exposed in normal use of the cushioned article, it is desirable that the peripheral portion of the cover fabric 43 be released by the gripping means 16 without leaving tear marks. In order to achieve this, the hooks 52 of the gripping means 16 may be replaced by spring loaded clasps similar to the types commonly used on earrings, suspenders, or the like, to releasably connect the peripheral portion 44 of the cover fabric 43 to the strips of material 50. In this embodiment, when the tensile forces between the fabric gripping means 16 and the peripheral portion 44 exceeds the frictional forces developed by the spring of the clasp, the edge 44a will slide out of the clasp without tearing.

When the edge 44a is free of the fabric gripping means 16, the diaphragm 21 pushes the edge 44a beneath the support 41 and compresses the peripheral portion 44 of the undersurface of the cover fabric 43 against the peripheral portion 45 of the undersurface of the support 41. Assuming, as indicated earlier, that both peripheral areas have been coated with a pressure sensitive adhesive, the cover fabric 43 will then become bonded to the support 41. Thus, the drawing of the diaphragm 21 around the component parts of the cushioned article causes the peripheral portion 44 of the cover fabric 43 to be accurately guided by the gripping means 16 about the corners of the core 42 and support 41, released from the gripping means 16, evenly brought into contact with the undersurface peripheral portion 45 of the support, and compressed thereagainst to bond the cover fabric 43 to the support 41, thereby insuring an improved finished article.

It should be understood that cushioned articles made in accordance with the invention may also be fabricated on a vacuum table 13 which is not provided with the raised member or platform 15. In this embodiment the support 41 would be placed directly upon the flat working surface 14 and the pressure sensitive adhesive coating would be applied to the vertical edge 47 of the support 41 instead of to the peripheral portion 45 of the undersurface of the support 41. Also, the vacuum table 13 would be slightly modified so that vacuum conduit 37 communicates with the vacuum chamber at a point that is clear of support 41. Thus, when vacuum is raised, the peripheral portion 44 of the cover fabric 43 would be bonded to the vertical edge 47 of the support 41 by the action of the diaphragm 21.

It should also be understood that a heat sensitive adhesive may be used to bond the cover fabric 43 to the support 41 in place of the pressure sensitive adhesive mentioned heretofore. When using a heat sensitive adhesive, it becomes necessary to heat the diaphragm 21 to a predetermined amount in order to activate the adhesive. A diaphragm heated to between 150° F. and 300° F. generally will suffice for most heat sensitive adhesive compositions, and, as indicated earlier, the heating means 30 (FIG. 1), employing infra red lamps 31, serves to radiantly heat the diaphragm to the desired temperature. Additional heaters (not shown) may be incorporated in the vacuum table 13 or in the raised member 15 to aid in activating the heat sensitive adhesive. It will be obvious to those skilled in the art that, irrespective of which type of adhesive is used, the adhesive may be applied to the peripheral portions of the cover fabric 43 and support 41 either before placing the components on the raised platform 15 or after doing so, the former being more convenient. Also, it will be apparent that an adhesive bond between the cover fabric 43 and the support 41 can be achieved even though only one of the peripheral portions of these components has been coated with adhesive, and, therefore, it is intended that this invention cover such an arrangement.

After reaching the desired amount of vacuum, the vacuum should be maintained for approximately one minute or so until the adhesives have set, at which point the vacuum may be released, the diaphragm 21 raised, and the finished upholstered cushion may be removed. The configuration of the apparatus and cushioned article during the time that vacuum is being applied has been illustrated in FIG. 3. This figure is illustrative of the conditions existing when full vacuum has been applied to the vacuum chamber and the fabric gripping means 16 has been released from the edge of the cover fabric 43.

The modification shown in FIG. 6 may be employed when it is desired to make cushioned articles having a generally circular shape. In this case the fabric gripping means 16 includes a flexible supporting material 50a having a generally rectangular overall outline, the outer edges of the material being arcuately cut out to allow the vacuum to be evenly distributed throughout the portions of the vacuum chamber between the material 50a and the diaphragm 21 and between the material 50a and the working surface 14. The raised member or platform 15b, in this embodiment, is given a circular shape similar to but smaller than the support 41 of the cushioned article. Also, the flexible supporting material 50a is provided with a central opening 55 which is similar in shape to but larger than the raised member or platform 15b. A ring of reinforcing fabric 56 may be provided at the inner periphery of the flexible material 50a to strengthen the material where the hooks 52 are mounted. When making a circularly shaped cushioned article, the hooks 52 would be spaced equally about the inner periphery 55 of the flexible material 50a in order to evenly guide the cover fabric about the circular core and support of the cushioned article so as to prevent wrinkling during the fabrication of the cushioned article.

The embodiment of FIG. 6 may be still further modified in a manner (not shown) to facilitate engagement between the hooks 52 and the peripheral portion of the cover fabric of the cushioned article. In this case, rather than connecting the outer edges of the flexible material 50a directly to the working surface 14 of the vacuum table, the edges may be secured to a movable intermediate frame or platen positioned between the table member 13 and the movable platen 18. The intermediate platen would be rectangular in shape, having the same general outline and dimensions as the perimetrical flange 19, and would be spring-biased upwardly from the table member. Guide pins carried by the table member and engaging apertures through the intermediate platen would be provided to hold it in vertical alignment with the table member. The springs employed would be chosen so that the intermediate platen is normally at rest in a position level with the top of the cushioned article, thereby placing the hooks 52 at the same level as the projecting edge of the cover fabric to facilitate connecting the hooks with the fabric. Upon lowering the movable frame or platen 18, it would first move into abutment with the intermediate platen, and then both platens would move downwardly against the spring bias into abutment with the table member 13 to form the vacuum chamber surrounding the component parts of the cushioned article.

Referring back to FIGS. 2 and 3, it may be seen that a cushioned article having a relatively soft support member 41 may be used to make the cushioned articles of this invention (e.g., vinyl film, rubber-resin films or any expanded or blown elastomeric composition which is formable or castable into a shape or contour to fit over the raised member or platform 15 of the vacuum table 13). When employing a soft support member 41, the platform 15 acts as a plug, and, therefore, the platform should have the same spatial form and outline as that desired in the finished article. The pre-formed or pre-cast soft support is placed over the platform 15 in such a manner as to form a peripheral rim extending downwardly adjacent the vertical edge of the platform 15. The outer surface of the dependent rim may then be coated with a suitable adhesive and the core of resilient padding material 42 centered atop the soft support. The assembly is then covered with a pre-cut cover fabric, the undersurface of which is coated with a film of adhesive in that portion which is adjacent to and ultimately makes contact with the adhesive on the dependent rim of the support. Next, the fabric gripping means 16 is releasably connected to the peripheral portion of the cover fabric, and then the air is evacuated between the diaphragm 21 and the working surface 14. In this manner, a cushioned article with a soft support member or base may be made by the apparatus and method of this invention.

The core 42 of resilient padding material in the cushioned article of this invention may be comprised of any conventional padding such as latex rubber foam, urethane foam, vinyl foam, curled hair, rubberized hair, excelsior, cotton wadding, wire, and insulated wire springs, or combinations of these materials. Anything that has resiliency may be employed as padding. The cover fabric 43 of the cushioned article may be any conventional upholstery fabric or film and the term is intended to include such natural and synthetic fabrics as cloth, leather, coated fabric, non-continuous or breathable coated fabrics, vinyl films, rubber-resin blends, etc.

Any of a number of thermosetting, thermoplastic and pressure sensitive adhesives may be used in this invention. A suitable heat sensitve adhesive is an aqueous dispersion of polyvinyl acetate resin containing about 55% to 60% solids dispersed therein, and a suitable pressure sensitive adhesive is the neoprene-phenolic cement described in U.S. Patent No. 2,918,442.

The diaphragm used in this process and apparatus may be any flexible elastomer having sufficient hot film strength to permit vacuum drawing. A latex having good elongation at both ambient and elevated temperatures may be used. However, it is preferred to use a diaphragm of a rubbery copolymer of vinylidene fluoride and hexafluoropropylene, which is a high heat-resistant rubber marketed by E. I. du Pont de Nemours & Company, Inc., under the registered trademark "Viton." Such diaphragms can withstand temperatures of 300° F. and above during continuous use and temperatures of 500° F. for occasional use.

While particular embodiments of this invention have been shown and/or described, it will be obvious to those skilled in the art that various changes and modifications may be made without departing from this invention in its broader aspects, and it is, therefore, aimed in the appended claims to cover all such changes and modifications as fall within the true spirit and scope of this invention.

Having thus described our invention, what we claim and desire to protect by Letters Patent is:

1. A method of making cushioned articles comprising providing a vacuum table having fabric gripping means carried thereby; placing on said table an assembly including a support element, a core of resilient material centered on the support element, and a fabric element covering the core and extending outwardly of the peripheral edge of the support element, at least one of said elements having a peripheral area thereof coated with an adhesive; releasably attaching said fabric gripping means to a plurality of spaced apart points on the peripheral area of said fabric element, moving a flexible elastomeric diaphragm over said assembly and into abutment with said vacuum table; and evacuating the space between said vacuum table and said diaphragm, thereby drawing the diaphragm firmly around the assembly and causing the peripheral area of the fabric element to be evenly guided by the fabric gripping means about the core and the support element, released from the fabric gripping means, and bonded to the peripheral area of the support element.

2. A method of making cushioned articles as described in claim 1 wherein said assembly is generally rectangular in shape, and wherein said fabric gripping means is positioned attached to said peripheral area adjacent the corners of said assembly so that as the diaphragm is drawn around the assembly the fabric element is guided evenly over the corners of the core and the support element.

3. A method of making cushioned articles as described in claim 1 wherein said assembly is generally circular in shape, and wherein said fabric gripping means is attached to said peripheral area at substantially equally spaced apart points about the periphery of said assembly so that as the diaphragm is drawn around the assembly the fabric element is guided evenly over the curved periphery of the core and the support element.

4. A method of making cushioned articles comprising providing a vacuum table having a raised member located centrally inwardly from the vertical edges thereof and having fabric grippers positioned at selected points about said raised member; placing on said raised member an assembly comprised of a relatively stiff support having a surface area larger than that of the raised member, a core of resilient padding material centered on the support, and a relatively pliable fabric covering the core and extending outwardly of the peripheral edge of the support, the support and fabric each having peripheral portions thereof coated with an adhesive; releasably attaching said fabric grippers to selected spaced apart points on the peripheral portion of the fabric; lowering a flexible elastomeric diaphragm over said assembly and onto said vacuum table; and evacuating the space between said vacuum table and said diaphragm, thereby drawing the diaphragm firmly around the assembly and causing the peripheral portion of the fabric to be evenly guided by the fabric grippers about the core and the support, released from the fabric grippers, and bonded to the peripheral portion of the support.

5. A method of making cushioned articles as described in claim 4, wherein said raised member and said assembly are generally rectangular in shape, and wherein said fabric grippers are positioned adjacent the corners of said raised member so that as the diaphragm is drawn around the assembly the fabric is guided evenly over the corners of the core and the support.

6. A method of making cushioned articles as described in claim 4, wherein said raised member and said assembly are generally circular in shape, and wherein said fabric grippers are positioned at equally spaced points about the periphery of said raised member so that as the diaphragm is drawn around the assembly the fabric is guided evenly over the curved periphery of the core and the support.

7. A method of making cushioned articles comprising providing a vacuum table having fabric grippers positioned at selected points on the surface thereof; placing on said table an assembly comprised of (1) a hard and rigid support having vertical peripheral edges, (2) a core of resilient padding material centered on the support, and (3) a fabric covering the core of resilient padding and extending over the vertical edges of the support, the vertical edges of the support being coated with a film of adhesive, and the undersurface of the fabric being coated with a film of adhesive in the peripheral portion thereof adjacent to the adhesive on the vertical edges of the support; releasably attaching the fabric grippers to selected spaced apart points on the peripheral portion of the fabric; lowering a flexible elastomeric diaphragm over said assembly and onto said vacuum table; and evacuating the air between the diaphragm and the surface of the vacuum table, thereby drawing the diaphragm firmly around the assembly and causing the peripheral portion of the fabric to be evenly guided by the fabric grippers about the core and the support, released from the fabric grippers, and bonded to the vertical edges of the support.

8. A method of making cushioned articles comprising providing a vacuum table having a raised member located centrally inwardly from the vertical edges thereof and having fabric grippers positioned at selected points about said raised member; placing on said raised member an assembly comprised of (1) a hard and rigid support having a larger surface area than the raised member of the vacuum table, (2) a core of resilient padding material centered on the support, and (3) a fabric covering the core of resilient padding and having edges extending beyond the peripheral edges of the support, the lower surface of the support being coated with a film of adhesive in that portion which is in close proximity to the peripheral edges thereof, and the undersurface of the covering fabric being coated with a film of adhesive in the peripheral portion thereof adjacent to the adhesive on the lower surface of the support; releasably attaching the fabric grippers to selected spaced apart points on the peripheral portion of the covering fabric; lowering a flexible elastomeric diaphragm over said assembly and onto said vacuum table; and evacuating the space between the diaphragm and the surface of the vacuum table, thereby drawing the diaphragm firmly around the assembly and causing the peripheral portion of the covering fabric to be evenly guided by the fabric grippers about the core and the support, released from the fabric grippers, and bonded to the undersurface of the support.

9. A method of making cushioned articles comprising providing a table member and fabric gripping means positioned adjacent a surface thereof; placing on said table member an assembly including a support element, a core of resilient material centered on the support element, and a fabric element covering the core and extending outwardly of the periphery of the support element; applying an adhesive to the peripheral portion of at least one of said elements; releasably attaching said fabric gripping means to a plurality of spaced apart points on the peripheral portion of said fabric element; moving a flexible elastomeric diaphragm over said assembly and into abutment with said table member; and evacuating the space between said table member and said diaphragm while concurrently releasing said fabric gripping means to thereby draw the diaphragm firmly around the assembly while guiding the peripheral portion of the fabric element evenly about the core so that the peripheral portion of the fabric element evenly contacts the peripheral portion of the support element and adheres thereto.

10. Apparatus for fabricating a cushioned article, said apparatus comprising a frame; a horizontally disposed first member carried by said frame and having a surface adapted to support thereon the component parts of the cushioned article including a cover fabric, means carried by said first member for releasably gripping a plurality of spaced apart points on the periphery of the cover fabric, a second member spaced apart from said first member and including a diaphragm adapted to overlie the surface of said first member, means for moving one of said members against the other of said members so that a sealed chamber is formed therebetween, and means for evacuating said chamber so that said diaphragm is drawn against the component parts of the cushioned article, compresses the component parts against one another, and causes the fabric gripping means to be released from the cover fabric.

11. Apparatus as described in claim 10 wherein said second member is carried by said frame, is horizontally disposed, and reciprocates from a position vertically spaced apart from said first member into a position abutting said first member to form a seal for said chamber adjacent the peripheral edges of the surface of said first member.

12. Apparatus as described in claim 11 wherein said first member is provided wtih a raised flange adjacent the peripheral edge thereof, said flange defining the perimeter of the working surface of said first member, and wherein said second member includes a rigid perimetrical second flange coextensive with said first flange, said diaphragm being carried by said second flange and extending therebeneath so that it is compressed between said first and second flanges when said second flange is moved into abutment with said first flange.

13. Apparatus as described in claim 12 wherein said fabric gripping means includes a plurality of hooks adapted to engage the peripheral portion of the cover fabric, said hooks being carried adjacent one end of each of a plurality of substantially inextensible flexible strips of material, the strips being secured to the surface of said first member at their other ends.

14. Apparatus as described in claim 12 wherein said fabric gripping means includes a plurality of hooks adapted to engage the peripheral portion of the cover fabric, said hooks being carried by a substantially inextensible flexible material having a central opening similar to but larger than the shape of the cushioned article to be formed, said hooks being positioned on the inextensible material at substantially equally spaced points about said central opening, and said inextensible material being connected to the surface of said first member at a plurality of points remote from said hooks.

15. Apparatus for fabricating a cushioned article from a base material, a resilient core, a cover fabric including a peripheral portion extending outwardly beyond the peripheral portion of the base material, and adhesive for joining the cover fabric to the base, said apparatus comprising: a frame; a rigid horizontal table member fixedly carried by said frame; a raised platform carried by said table member and centrally positioned with respect thereto for supporting the component parts of the cushioned article, said platform having a smaller surface area than the component parts received thereon so that the edges of the component parts project radially outwardly of the platform; means carried by said table member for releasably gripping selected spaced apart points on the peripheral portion of the cover fabric; a diaphragm supporting member having a central opening covered by said diaphragm; means for moving said supporting member into abutment with said table member to thereby form a sealed chamber surrounding the cushioned article; means for evacuating said chamber so that said diaphragm is drawn against the component parts of the cushioned article, releases said gripping means, and compresses the component parts against one another to thereby cause the peripheral portion of the cover fabric to evenly overlap and adhere to the peripheral portion of the base material.

16. Apparatus as described in claim 15 wherein said raised platform is generally rectangular in shape, and wherein said fabric gripping means includes a plurality of hooks adapted to engage the peripheral portion of the cover fabric adjacent the corners of said raised platform, said hooks being carried by said table member through the intermediary of a substantially inextensible flexible material.

17. Apparatus as described in claim 15, wherein said raised platform is generally circular in shape, and wherein said fabric gripping means includes a plurality of hooks adapted to engage the peripheral portion of the cover fabric, said hooks being carried by a substantially inextensible flexible material having a central opening concentric with said raised platform, said hooks being positioned on the extensible material adjacent to and substantially equally spaced about said central opening, and said inextensible material being connected to said table member at a plurality of points remote from said hooks.

18. Apparatus for fabricating a cushioned article from a stiff base material, a resilient core, a fabric cover including a peripheral portion extending outwardly beyond the peripheral portion of the base material, and adhesive for joining the cover fabric to the base, said apparatus comprising a frame; a rigid horizontal table member fixedly carried by said frame, said table member including a working surface having a raised platform centrally positioned thereon and a raised flange defining the perimeter of said working surface, said platform being adapted to support the component parts of the cushioned article thereon; means carried by said table member for releasably gripping a plurality of selected spaced apart points on the peripheral portion of the cover fabric; a platen movably carried by said frame and positioned above said table member, said platen including a rigid perimetrical flange coextensive with the flange on said table member and defining an open central portion substantially coextensive with said working surface; a diaphragm carried by said platen, said diaphragm extending across the lower surface of said platen and being coextensive therewith; heating means carried by said frame above and closely adjacent to said platen for heating said diaphragm through said opening; means for moving said platen into abutment with said table member so that the diaphragm is compressed between said flanges, thereby forming a sealed chamber enclosing the component parts of the cushioned article; and means for evacuating said chamber to draw said diaphragm against said fabric gripping means and about the component parts of the cushioned article, thereby releasing said gripping means and compressing the component parts of the cushioned article against one another and against said platform.

19. Apparatus as described in claim 18 wherein said raised platform is generally rectangular in shape, and wherein said fabric gripping means includes a plurality of hooks adapted to engage the peripheral portion of the cover fabric adjacent the corners of said raised platform, said hooks being carried by said table member through the intermediary of a plurality of substantially inextensible strips of material, each of the strips of material being in alignment with one of the corners of said platform.

20. Apparatus as described in claim 18, wherein said raised platform is generally circular in shape, and wherein said fabric gripping means includes a plurality of hooks adapted to engage the peripheral portion of the cover fabric, said hooks being carried by a substantially inextensible flexible material having a central opening concentric with said raised platform, said hooks being mounted on the inextensible material adjacent to and spaced equally distant about said central opening, and said inextensible material being connected to said table member at a plurality of points remote from said hooks.

21. Apparatus for fabricating a cushioned article from an assembly including a base element, a core of resilient material centered on the base element, and a fabric element covering the core and extending outwardly of the peripheral edge of the base element, at least one of said elements having a peripheral area thereof coated with an adhesive, said apparatus comprising: a frame; a first member carried by said frame and adapted to support said assembly thereon; a second member spaced apart from said first member and including an elastomeric diaphragm adapted to overlie said assembly and at least a portion of the surface of said first member; means for moving one of said members into abutment with the other of said members to form a sealed chamber therebetween; means for evacuating said chamber to draw said diaphragm about said assembly; and means positioned on one of said members and releasably connected to selected spaced apart points on the peripheral portion of the fabric element for guiding the peripheral portion of the fabric element at least partially about the core of said assembly while the chamber is being evacuated.

References Cited in the file of this patent

UNITED STATES PATENTS

| | | |
|---|---|---|
| 2,363,431 | Moorhouse | Nov. 21, 1944 |
| 2,576,121 | Kamborian | Nov. 27, 1951 |
| 2,690,593 | Abercrombie | Oct. 5, 1954 |
| 2,802,764 | Slayter et al. | Aug. 13, 1957 |
| 2,814,077 | Moncrieff | Nov. 26, 1957 |

FOREIGN PATENTS

| | | |
|---|---|---|
| 863,512 | France | Jan. 2, 1941 |

UNITED STATES PATENT OFFICE
CERTIFICATE OF CORRECTION

Patent No. 3,146,143                  August 25, 1964

Richard C. Bolesky et al.

It is hereby certified that error appears in the above numbered patent requiring correction and that the said Letters Patent should read as corrected below.

Column 8, line 7, for "element," read -- element; --; same column 8, lines 19 and 20, strike out "positioned".

Signed and sealed this 13th day of April 1965.

(SEAL)
Attest:

ERNEST W. SWIDER
Attesting Officer

EDWARD J. BRENNER
Commissioner of Patents